US006656530B2

(12) United States Patent
Thieben et al.

(10) Patent No.: US 6,656,530 B2
(45) Date of Patent: Dec. 2, 2003

(54) AUTOMOTIVE REFINISH COATINGS WITH LOW VOLATILE ORGANIC CONTENT

(75) Inventors: Lawrence E. Thieben, Waterville, OH (US); John C. Goan, Toledo, OH (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/061,628

(22) Filed: Feb. 1, 2002

(65) Prior Publication Data

US 2003/0149192 A1 Aug. 7, 2003

(51) Int. Cl.[7] .......................... B05D 7/14; C09D 167/08
(52) U.S. Cl. ................ 427/385.5; 427/388.2; 427/393.5; 525/444.5; 528/295.5
(58) Field of Search .................. 525/444.5; 528/295.5; 427/388.2, 393.5, 385.5

(56) References Cited

U.S. PATENT DOCUMENTS

| | | | |
|---|---|---|---|
| 4,772,680 A | 9/1988 | Noomen et al. | 528/229 |
| 5,288,802 A | 2/1994 | Walters et al. | 525/110 |
| 5,332,785 A | 7/1994 | Brindoepke | 525/111 |
| 5,344,897 A | 9/1994 | Brindoepke et al. | 525/526 |

FOREIGN PATENT DOCUMENTS

| | | | |
|---|---|---|---|
| DE | 196 20 351 A1 | 11/1997 | C09D/167/06 |
| EP | 0 483 915 A1 | 10/1991 | C09D/133/06 |
| WO | 00/68331 | * 11/2000 | |

OTHER PUBLICATIONS

English Language Abstract for DE 196 20 351 A1.

* cited by examiner

*Primary Examiner*—Patricia A. Short

(57) ABSTRACT

The refinish compositions contain an acetoacetate resin based on a monomeric polyol or a hydroxy-functional oligomer of such a polyol; a blocked polyamine (polyketimine and/or polyaldimine), pigment, and alkyd polymer. The alkyd is not reactive toward the acetoacetate resin or the blocked polyamine. The refinish compositions may be prepared from an intermix system that has a plurality of color bases and an unpigmented component. Each color base includes the alkyd resin and one or more pigments dispersed with the alkyd resin. The unpigmented component includes at least one of the acetoacetate-functional resin or the blocked polyamine. A drier for the alkyd resin may be included in one of the components or in a separate, additional component.

20 Claims, No Drawings

US 6,656,530 B2

1

AUTOMOTIVE REFINISH COATINGS WITH LOW VOLATILE ORGANIC CONTENT

FIELD OF THE INVENTION

The present invention is directed generally to coating compositions and methods, particularly automotive refinish topcoat compositions and refinishing methods.

BACKGROUND OF THE INVENTION

Polyurethane systems have been widely used for refinish coatings. These systems contain hydroxyl-functional resins that react with polyisocyanate crosslinkers to form polyurethane coatings with excellent durability, toughness, and solvent resistance. In automotive refinish coating compositions, the polyisocyanates are not blocked so that the reaction with the hydroxyl groups will take place within a reasonable amount of time without heating or with heating at only low temperatures of perhaps up to 150° F.

Given the reactivity between the unblocked polyisocyanate and the hydroxyl-functional polyol at typical storage temperatures, these materials are segregated into separately stored components until just shortly before application of the coating composition to the substrate to be coated. This type of coating composition, in which the materials that react to cure the coating are segregated in two separately stored components, is referred to in the art as a "two-component" or "two-package" or "2K" coating composition. Automotive refinish coatings may be formulated as two-component compositions in each desired color, or may be prepared as an intermix system including separately stored color components, a crosslinker component, and possibly other components such as a reducer component or an unpigmented component containing resin or polymer reactive with the crosslinker. While two-component compositions avoid premature reactions, care must be taken by the end-user to combine the correct amounts of the two components in order to obtain the desired coating properties.

Another issue of concern to manufacturers of refinish coatings has been increasing the solids content of refinish coatings compositions in order to reduce regulated emissions during application of the coatings. While regulated emissions are of concern in applying other coatings as well, reducing such emissions with automotive refinish coatings is a particularly difficult problem. One of the ways in which the need for low emissions formulations has been addressed for coatings for original finish ("OEM" coatings) for industrial or automotive applications has been by using resins and polymers with lower molecular weights. The lower molecular weight resins generally have lower viscosities, and thus the compositions requires less solvent to achieve the desired application viscosity. Because of their low molecular weight, however, such resins must have higher functionality and be further reacted during cure in order to provide the desired performance in the applied coating. OEM coatings are typically baked at relatively high temperatures (typically about 200° F. (93° C.) and higher) to cure the compositions in a reasonably short time. Unlike OEM coatings, automotive refinish coatings must be formulated as either thermoplastic compositions or thermosetting compositions that cure at relatively low temperatures, both because the many plastic components of a finished vehicle cannot withstand high temperature bakes and because many of the collision shops using the paint could not afford equipment large enough for a baked finish on a vehicle. On the other hand, it is still desirable to have the applied refinish coating "dry to handle" in a short time.

Room temperature-curing coating compositions containing an acetoacetate-functional addition polymer and a blocked polyamine are disclosed in Noomen et al., U.S. Pat. No. 4,772,680. The addition polymer has a number average molecular weight of 1000 to 10,000 and 3.5 to 45% by weight acetoacetate groups. The blocked polyamines have number average molecular weights of 250 to 4000. The composition can be cured at room temperature. The acetoacetate-functional addition polymer, however, like the hydroxyl-functional addition polymer used with polyisocyanate curing agents, must have a low molecular weight if compositions with low organic solvent content are desired. Low molecular weight polymers, on the other hand, require a much higher functional group content and take longer to cure sufficiently to become dry to the touch.

EP 0 483 915 similarly discloses a binder composition in which an acrylate polymer is amine, ketimine, or aldimine-functional and a crosslinking agent has acetoacetate functionality. This composition is comparable to the Nooman composition in that it contains an acrylic polymer and a curing agent, although the functionalities of the polymer and curing agent have been reversed relative to the Nooman composition.

U.S. Pat. Nos. 5,344,897 and 5,332,785 to Brindoepke et al. disclose a two-component automotive refinish coating that contains an acetoacetate-functional polymer and an aldimine or ketimine. The acetoacetate-functional polymer is prepared by reacting an aromatic polyepoxide (bisphenol A or bisphenol F) with water, amine, or hydroxycarboxylic acid and then with acetoacetic acid to introduce the acetoacetate groups. The Brindoepke patent reports that its compositions harden rapidly and have shorter gelling time than does the composition with the acetoacetate-functional addition polymer. Aromatic epoxy-based resins, however, are sensitive to ultraviolet light and will chalk and lose gloss in outdoor exposure. Additionally, these are poor pigment dispersants. Finally, the Brindoepke patent compositions have undesirably high levels of volatile organic compounds.

Similarly to the Brindoepke patents, U.S. Pat. No. 5,288,802 to Walters et al. describes a curable refinish primer composition containing an amine-functional polyepoxide resin (which can be blocked to form a ketimine or aldimine), an acetoacetate-containing polyester, and a polyacrylate. The polyacrylate contains at least two acrylate groups. The Walters patent suggests that both the acetoacetate groups and the acrylate groups react with the ketimine-containing polyepoxide resin. The Walters patent composition, however, suffers from the same drawbacks as the Brindoepke patent compositions.

DE 196 20 351 A1 discloses a coating composition in which the acetoacetate functionality is on an unsaturated polyester and the coating composition contains, in addition, an acetoacetate-functional polyalcohol reactive diluent; a hardener selected from epoxide-amine adducts, polyfunctional amines, and ketimines; a radically or ionically polymerizable compound; and a photoinitiator.

It would be desirable to have a coating composition that offers high solids content along with being "dry to handle" a short time after application.

SUMMARY OF THE INVENTION

The ambient curing compositions of the invention contain an acetoacetate-functional compound having at least two acetoacetate groups and a molecular weight of up to about 1000; a blocked polyamine, particularly a polyketimine and/or polyaldimine; an alkyd; and pigment. The alkyd is not reactive toward the acetoacetate-functional compound or the blocked polyamine. The ambient curing compositions may be used for refinishing automotive vehicles, metal signs, and so on.

The compositions of the invention can be formulated with a low content of volatile organic solvents and provide coatings that are dry to the touch in a short time. A metal drier can be included in the composition to provide for further curing of the coating.

The invention also provides an intermix system that has a plurality of color bases and one or more clear components. The color bases each include the alkyd resin and at least one color and/or special effect pigment. One of the acetoacetate-functional compound and the blocked polyamine is in a clear component, and the other may be in the color bases or may be in a different clear component. In one embodiment, the intermix system has a plurality of color bases containing alkyd and pigment, a first clear component containing the acetoacetate-functional compound, and a second clear component containing blocked polyamine. If used, a drier can be included in the color bases or in a clear component. In another embodiment of the intermix system, the blocked polyamine and alkyd resin are included in the color bases and the acetoacetate-functional compound and, optionally, the drier are incorporated in the crosslinking component. The alkyd resin disperses one or more pigments in each color base.

The invention further provides a method of refinishing at least a part of the exterior surface of an automotive vehicle with a refinish composition of the invention. The refinish composition of the invention is applied as a basecoat layer and, after the applied coating is dry to handle, a clearcoat composition is applied over the basecoat layer. The clearcoat layer is then cured, optionally along with further curing of the basecoat layer.

DETAILED DESCRIPTION OF THE INVENTION

The acetoacetate-functional compound of the automotive refinish composition has at least two acetoacetate groups and has a molecular weight of up to about 1000. Preferably, the acetoacetate-functional compound has 2 to 5, more preferably 3 to 5, and even more preferably 3 or 4 acetoacetate groups. The acetoacetate-functional material may be prepared using low molecular weight polyhydroxy compounds or oligomers having two or more hydroxyl groups, preferably two or three hydroxyl groups. Examples of suitable low molecular weight polyhydroxy compounds and oligomers include, without limitation, ethylene glycol, propylene glycol, trimethylolpropane and 1,6-dihydroxy-hexane; hydroxyl group-containing esters of such polyols with dicarboxylic acids, polycarboxylic acid, or anhydrides of these; ethoxylated and/or propoxylated polyhydroxyl compounds; and mixtures of these modified or unmodified polyhydric alcohols. The polyol compound may also be based on reaction of an oxirane-functional compound, for example a glycidyl ester or ether, with an acid-functional compound. Either the oxirane-functional compound or the acid-functional compound should be polyfunctional to provide a polyol product. In one preferred embodiment, a polyol is reacted with an anhydride, then the resulting polycarboxylic acid compound is reacted with a mono-functional glycidyl ester or ether to produce a beta-hydroxy ester.

The acetoacetate functionality may be introduced to the polyol or polyol oligomer by reaction with an alkyl acetoacetate, such as, for example, tert-butyl acetoacetate. At least a portion of the hydroxyl groups, and preferably all of the hydroxyl groups, are transesterified to provide the acetoacetate functionality. In the case of a beta-hydroxy ester, the acetoacetate group is beta to an ester linkage. The acetoacetate compound should have at least two, preferably from two to about five, more preferably from two to four acetoacetate groups. The molecular weight of an oligomeric acetoacetate compound may be from about 150 to about 980, preferably from about 250 to about 980.

The automotive refinish composition also includes a blocked polyamine, which may have ketimine and/or aldimine groups. The polyamine compound may be aliphatic, cycloaliphatic, aromatic, or cycloaromatic. Suitable polyamines include, without limitation, alkylene diamines such as hexamethylenediamine and 1,8-diaminoctane, the isomers of diaminocyclohexane 2,5-diamino-2,5-dimethylhexane, 1-amino-3,3,5-trimethyl-5-aminomethylcyclohexane, the isomers of 1-methylcylohexandiamine, other alkyl-substituted cyclohexanediamines such as isopropyl-2,4- and/or-2,6-diaminocyclohexane, 1,3-cyclohexanebis(methylamine), 5-amino-2,2,4-trimethyl-1-cyclopentane-methylamine, 2,4- and 4,4'-methylenebis(cyclopexylamine), 3,3'-dimethyl-4,4'-methylenebis(cyclohexylamine), the isomers of diaminodicyclohexylmethane containing a methyl group as main substituent (monomethyldiaminodicyclohexylmethane), 3(4)-aminomethyl-1-methylcyclohexylamine, and bridged cyclohexanediamines. Preferred primary polyamines may be represented by the following compounds: 1,3-cylochexanediamine, 1,4-cyclohexanediamine, 1,3-cyclohexanebis(methylamine), 1-amino-3,3,5-trimethyl-5-(aminomethyl)cyclohexane, 4,4'-diaminodicyclohexylmethane, 3,3'-dimethyl-4,4'-methylenebis(cyclohexylamine), 1-methyl-2,4-diaminocyclohexane, 1-methyl-2,5-diaminocyclohexane, 1-methyl-3,5-diaminocyclohexane, 1-methyl-2,6-diaminocyclohexane, the isomers of monomethyldiaminodicyclohexylmethane, triaminononane, and 3(4)-aminomethyl-1-methyl-cyclohexylamine. Other useful polyamines include polyalkylene polyamines such as diethylene triamine, triethylene tetramine, tetraethylene pentamine, and so on.

The amine groups of the polyamine are reacted to form ketimine and/or aldimine groups. The reaction is well known in the art and may be carried out by any of the usual methods. The aldehyde or ketone preferably has no more than 18 carbon atoms, more preferably from 3 to about 10 carbon atoms. Examples of suitable blocking agents include, without limitation, acetone, diethyl ketone, methyl isobutyl ketone, isobutyraldehyde, hydroxybutylraldehyde, pentanone, cyclohexanone, ethyl amyl ketone, hydroxycitronellal, isophorone, and decanone. Aliphatic and cycloaliphatic ketones are preferred, particularly those with 3 to 8 carbon atoms. The blocked polyamines preferably have a molecular weight of about 125 to about 800, particularly preferably of about 300 to about 600.

The automotive refinish composition includes the acetoacetate-functional material and the blocked polyamine in relative equivalent amounts of from about 1.5 equivalents of the acetoacetate-functional material for about 1 equivalent of blocked amine of the blocked polyamine to about 1 equivalent of the acetoacetate-functional material for about 1.5 equivalents of blocked amine of the blocked polyamine, preferably about 1.2 equivalents of the acetoacetate-functional material for about 1 equivalent of blocked amine of the blocked polyamine to about 1 equivalent of the acetoacetate-functional material for about 1.2 equivalents of blocked amine of the blocked polyamine, and particularly preferably about 1 equivalent of the acetoacetate-functional material for about 1 equivalent of blocked amine.

The automotive refinish composition also includes pigment dispersed by an alkyd resin. The alkyd resin is not reactive toward the acetoacetate resin or the blocked polyamine.

Alkyd resins may be prepared by condensation polymerization of one or more dibasic acids and/or their esterifiable derivatives such as anhydrides with one or more polyols, particularly diols, and an unsaturated, monofunctional fatty acid. Preferred unsaturated, monofunctional fatty acids include soybean oil, tall oil, linseed oil, and combinations of these. Alkyds are air drying (oxidatively crosslinking) polymers, and metal driers may be included in the refinish coating composition to promote air drying.

The alkyd may have a number average molecular weight, of 500 to 10,000, preferably 1000 to 5000. Examples of suitable dicarboxylic acids include, without limitation, phthalic acid, isophthalic acid, terephthalic acid, halophthalic acids such as tetrachloro- or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxlic acid, 1,3-cyclohexane-dicarboxylic acid, 1,4-cyclohexane-dicarboxylic acid, 4-methylhexahydrophthalic acid, endomethylenetetrahydropthalic acid, tricyclodecane-dicarboxylic acid, endoethylenehexahydropthalic acid, camphoric acid, cyclohexanetetracarboxylic acid, cyclobutanetetracarboxylic acid, and the like, as well as combinations of these. The cycloaliphatic dicarboxylic acids may be employed either in their cis or in their trans form or as a mixture of the two forms. Also suitable are the esterifiable derivatives of the above polycarboxylic acids, for example their single or multiple esters with aliphatic alcohols having 1 to 4 carbon atoms or hydroxy alcohols having 1 to 4 carbon atoms. In addition, it is also possible to employ anhydrides of the above acids.

Polyols suitable for the preparation of the alkyds include, without limitation, polyhydric alcohols such as ethylene glycol, propanediols, butanediols, hexanediols, neopentyl glycol, diethylene glycol, cyclohexanediol, cyclohexanedimethanol, trimethylpentanediol, ethylbutylpropanediol ditrimethylolpropane, trimethylolethane, trimethylolpropane, glycerol, pentaerythritol, dipentaerythritol, trishydroxyethyl isocyanate, polyethylene glycol, polypropylene glycol, and the like, as well as combinations of these.

Lactones, especially ε-caprolactone, are also suitable for the preparation of the alkyds. The alkyd could be prepared by using a polylactone polyol as a polyol reactant, along with polycarboxylic acids and unsaturated acid, in the alkyd synthesis.

The alkyd synthesis may be carried out at temperatures of between 180 and 280° C. in the presence, if desired, of an appropriate esterification catalyst, for example lithium octanoate, dibutyl tin oxide, dibutyltin dilaurate, para-toluene sulfonic acid and the like.

The coating composition includes from about 10% to about 60% by weight, preferably from about 15% to about 45% by weight of the alkyd polymer, based on the combined weights of the alkyd polymer, the acetoacetate-functional material, and the blocked polyamine.

The refinish coating composition further includes one or more pigments dispersed by the alkyd resin. Virtually any organic or inorganic color pigment or special effect flake pigment may be included. Examples of suitable classes of organic pigments that may be used include, without limitation, metallized and non-metallized azo pigments, azomethine pigments, methine pigments, anthraquinone pigments, phthalocyanine pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments, monoarylide and diarylide yellows, benzimidazolone yellows, tolyl orange, naphthol orange, and quinophthalone pigments. Examples of suitable inorganic pigments include, without limitation, metal oxide pigments such as titanium dioxide, iron oxides including red iron oxide, black iron oxide, and brown iron oxide, and chromium oxide green; carbon black; ferric ferrocyanide (Prussian blue); ultramarine; lead chromate; and so on.

The color and/or flake pigment or pigments are dispersed in the alkyd resin according to known methods. In general, the pigment and alkyd are brought into contact under a shear high enough to break the pigment agglomerates down to the primary pigment particles and to wet the surface of the pigment particles with the dispersing resin. The breaking of the agglomerates and wetting of the primary pigment particles are important for pigment stability and color development. The pigment dispersions are combined in the coating composition.

A sufficient number of color components are included in the intermix system so that they can be used together to produce the universe of desired refinish coating colors. It is desirable to minimize the number of color components as much as possible, but a sufficient number of color components must be included so that any desired refinish color can be formulated.

Metallic colors are produced using one or more special effect pigments. Special effect pigments are those that can produce a gonioapparent effect in a coating layer. For example, the American Society of Testing Methods (ASTM) document F284 defines metallic as "pertaining to the appearance of a gonioapparent material containing metal flake." Metallic basecoat colors may be produced using metallic flake pigments like aluminum flake pigments including colored aluminum flake pigment, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance when viewed at different angles.

Unlike the solid color pigments, the flake pigments do not agglomerate and are not ground under high shear because high shear would break or bend the flakes, diminishing or destroying the gonioapparent effects. The flake pigments are satisfactorily dispersed in the alkyd resin by stirring under low shear.

The coating composition may further include a drier. Driers suitable for use with alkyd resins are well-known in the art. Suitable examples include, without limitation, the cobalt, lead, manganese, iron, zinc and calcium slats of naphthenic, linoleic, and 2-ethylhexanoic acids, rosin, and tall oil, such as cobalt linoleate, cobalt naphthenate, manganese naphthenate, and so on.

The refinish coating composition may contain other materials, including additives such as rheology control agents, surfactants, fillers (e.g., talc or barytes), stabilizers, wetting agents, dispersing agents, adhesion promoters, fillers, UV absorbers, hindered amine light stabilizers, and so on.

The intermix system includes the color bases containing alkyd resin and pigment and one or more clear components. One of the acetoacetate-functional compound and the blocked polyamine is in a clear component, and the other may be in the color bases or may be in a different clear component. In one embodiment, the intermix system has a plurality of color bases containing alkyd and pigment, a first clear component containing the acetoacetate-functional compound, and a second clear component, the crosslinking component, containing blocked polyamine. If used, a drier can be included in the color bases, in a clear component containing the acetoacetate-functional compound, or in a separate component, which may, for example, contain solvent but no resin. In another embodiment of the intermix system, the blocked polyamine and alkyd resin are included in the color bases and the acetoacetate-functional compound and, optionally, the drier are incorporated in the crosslinking component. The intermix system is especially suited to preparing automotive refinish color topcoats, including basecoats. Alternatively, the coating composition of the invention could be a multi-component primer coating composition, having only one color component or only a limited number of color components.

The alkyd resin is used to disperse the pigment in the color component, but some pigments or combinations of pigments require more resin to form a stable dispersion of suitable viscosity. Alkyd resin may be added to color components as needed so that each color component will contribute the desired amount of alkyd resin to the basecoat composition. The amount of alkyd in the coating preparing by combining the different components may be modified to adjust the hiding power (the ability to get hiding at the desired dry-film thickness) or other properties.

The refinish coating composition may include one or more solvents. In general, the solvent can be any organic solvent and/or water. In one preferred embodiment, the solvent is an organic solvent. The solvent may be selected from aliphatic solvents or aromatic solvents, for example ketones, esters, acetates, toluene, xylene, aromatic hydrocarbon blends, or a combination of any of these. In a preferred embodiment of the invention, the solvent is present in the coating composition in an amount of from about 5 weight percent to about 95 weight percent, preferably from about 20 weight percent to about 30 weight percent.

In the intermix system, the solvent can be included in any of the components. Generally, each of the components will include one or more kinds of organic solvent.

The refinish coating composition of the invention is applied in a layer to a desired area of the substrate to be refinished. When the applied layer is an applied basecoat layer, it is allowed to dry, and then a clearcoat composition is applied in a layer over the basecoat layer. The basecoat composition according to the invention provides an advantage in that the clearcoat composition can be applied in as short a time as 5 minutes after application of the basecoat layer. In general, no more than about 15 minutes of dry time is required before the clearcoat composition is applied. After application of the clearcoat layer, the composite coating is allowed to fully cure, both by oxidative cure of the alkyd resin and reaction of the acetoacetate functionality and liberated amine functionality. Likewise, single layer pigmented topcoats or primer coatings according to the invention are allowed to cure.

The refinished substrate may be a vehicle, including automotive vehicle, ship, train, or commercial vehicle, or any component of such a vehicle, or any other substrate for which ambient cure is desired, such as metal signs.

The invention is further described in the following examples. The examples are merely illustrative and do not in any way limit the scope of the invention as described and claimed.

Preparation 1. Preparation of Tri-Functional Acetoacetate Resin

Tris-2-hydroxyethyl isocyanurate (CAS# 839-90-7) was reacted with methyl hexahydrophthalic anhydride (CAS #25550-51-0) in methyl amyl ketone as solvent, then the product was reacted with glycidyl neodecanoate (Cardura E, available from Shell Resin-CAS #2676145-5). The methyl amyl ketone solvent was removed by vacuum stripping, leaving a liquid tri-hydroxy resin.

500 grams of the vacuum-stripped tri-hydroxy resin were placed in a two-liter, 3-necked, round-bottom flask fitted with a heating mantle, stirrer, thermocouple, nitrogen inlet, and distillation head with thermometer, condenser and receiver. To the flask were added 177 grams of tert-butylacetoacetate and 150 grams of ethyl 3-ethoxypropionate solvent. The flask was heated slowly to 156° C. under a nitrogen gas purge. When the liquid temperature reached about 115° C., distillation of by-product tert-butanol was initiated at a head temperature of 85° C. The reaction temperature was slowly increased in stages to 156° C., at which point about 98% of the calculated amount of tert-butanol by-product had been removed. The yield of acetoacetate-functional resin product was 580 grams dissolved in 150 grams of EEP solvent. The resin product had an equivalent weight of 545 grams/equivalent based on nonvolatiles. The resin product was an amber-colored liquid with a viscosity of 10 Stokes.

Preparation 2. Preparation of Acetoacetate Resin from Glycerol

A 2-liter, 3-necked flask set up as described in Example 1 was charged with 138.1 grams glycerol and 759.4 grams of tert-butylacetoacetate. Under a nitrogen flow, the flask was heated in stages to 175° C. Distillation of byproduct tert-butanol began at a head temperature of 95° C. and was completed when about 97% of the theoretical amount of tert-butanol was collected. The yield of approximately 98% pure glycerol triacetoacetate (GTM) was 537 grams. The product was a light-colored, mobile liquid with a viscosity of 85–90 cps (Brookfield), a molecular weight of approximately 344 and an acetoacetate equivalent weight of 114.8.

Preparation 3. Preparation of Acetoacetate Resin from Trimethylolpropane Resin

Trimethylolpropane was reacted with methyl hexahydrophthalic anhydride (CAS #25550-51-0) in methyl amyl ketone as solvent, then the product was reacted with glycidyl neodecanoate (Cardura E, available from Shell Resin—CAS #26761-45-5). The methyl amyl ketone solvent was removed by vacuum stripping, leaving a liquid tri-hydroxy resin.

A 2-liter, 3-necked flask set up as described in Example 1 was charged with 550 grams of the tri-hydroxy resin, 467 grams of tert-butylacetoacetate, and 100 grams of EEP solvent. Under a nitrogen flow, the flask was heated in stages to 150° C. Distillation of by-product tert-butanol began at a head temperature of 95° C. and was completed when about 95% of the theoretical amount of tert-butanol was collected. The product had a molecular weight of 812 and an acetoacetate equivalent weight of 272 grams/equivalent (on nonvolatiles) and 3212 grams/equivalent (on solution).

Preparation 4: Preparation of Acetoacetate Resin

A polyacetoacetate was prepared similarly to Example 3, except that the ratio of trimethylolpropane to methylhexahydrophthalic anhydride was varied to produce a polyol intermediate with an hydroxy equivalent weight of about 238. The polyactoacetate was prepared using this intermediate by the same procedure as in Example 3. The product had a molecular weight of 966 and an equivalent weight of 322, based on non-volatiles.

Preparation 5. Preparation of Color Base

A white base was prepared by dispersing titanium dioxide pigment in a medium length soya alkyd resin (64% NV, prepared by reacting 39% by weight soya fatty acid, 12.6% by weight benzoic Acid, 22.9% by weight pentaerythritol, and 25.5% by weight phthalic anhydride) at a pigment to resin weight ratio of 4.14, using a high speed disperser to a grind fineness of 10 microns or less.

Examples. Preparation and Evaluation of Coating Compositions

Examples 1–4 of the invention were made by combining materials in the amounts shown in the following table.

|  | Example 1 | Example 2 | Example 3 | Example 4 |
|---|---|---|---|---|
| Acetoacetate Resin of Preparation 1 | 16.1% by weight | — | — | — |
| Acetoacetate Resin of Preparation 2 | — | 16.4% by weight | — | — |
| Acetoacetate Resin of Preparation 3 | — | — | 16.7% by weight | — |
| Acetoacetate Resin of Preparation 4 | — | — | — | 19.3% by weight |
| Color Base of Example 5 | 49.5% by weight | 58.5% by weight | 62% by weight | 69% by weight |
| Desmophen LS-2965[1] | — | — | 8.6% by weight | 8.6% by weight |
| Setalux 2002[2] | 7.3% by weight | 16.7% by weight | | |
| methyl isobutyl ketone | 27.4% by weight | 8.9% by weight | 13.4% by weight | 9% by weight |
| Tack-Free Time | 23 minutes | 25 minutes | 45 minutes | 40 minutes |

[1]Desmophen LS-2965 is available from Bayer
[2]Setalux 7002 BX-55 is available from Akzo Nobel (ketimine resin, EW 238 grams per equivalent of amine, 100% solids, visc. 3–7 centipoise)

The invention has been described in detail with reference to preferred embodiments thereof. It should be understood, however, that variations and modifications can be made within the spirit and scope of the invention.

What is claimed is:

1. An ambient-curing coating composition, comprising
    an acetoacetate-functional material having at least two acetoacetate groups, wherein said acetoacetate-functional material has a molecular weight of up to about 1000;
    a blocked polyamine compound;
    a pigment; and
    an alkyd, wherein the alkyd is not reactive toward the acetoacetate-functional material or the blocked polyamine compound.

2. A coating composition according to claim 1, further comprising a metal drier.

3. A coating composition according to claim 1, wherein the acetoacetate-functional material has 2 to 5 acetoacetate groups.

4. A coating composition according to claim 1, wherein the acetoacetate-functional material has 3 to 5 acetoacetate groups.

5. A coating composition according to claim 1, wherein the acetoacetate-functional material has one or more ester linkages beta to the acetoacetate functionality.

6. A coating composition according to claim 1, wherein the blocked polyamine compound is prepared by blocking an amine selected from the group consisting of 1,3-cylcohexanediamine, 1,4-cyclohexanediamine, 1,3-cyclohexanebis(methylamine), 1-amino-3,3,5-trimethyl-5-(aminomethyl)cyclohexane, 4,4'-diaminodicyclohexylmethane, 3,3'-dimethyl-4,4'-methylenebis(cyclohexylamine), 1-methyl-2,4-diaminocyclohexane, 1-methyl-2,5-diaminocyclohexane, 1-methyl-3,5-diaminocyclohexane, 1-methyl-2,6-diaminocyclohexane, the isomers of monomethyldiaminodicyclohexylmethane, triaminononane, 3(4)-aminomethyl-1-methylcyclohexylamine, polyalkylene polyamines, and combinations thereof.

7. A coating composition according to claim 1, wherein the blocked polyamine compound is prepared by blocking a primary amine with an aldehyde or ketone having from 3 to about 10 carbon atoms.

8. A coating composition according to claim 1, wherein the blocked polyamine compound has a molecular weight of about 125 to about 800.

9. A coating composition according to claim 1, wherein the blocked polyamine compound has a molecular weight of about 300 to about 600.

10. A coating composition according to claim 1, wherein the acetoacetate-functional material and the blocked polyamine compound are included in relative equivalent amounts of from about 1.5 equivalents of the acetoacetate-functional material for about 1 equivalent of the blocked polyamine compound to about 1 equivalent of the acetoacetate-functional material for about 1.5 equivalents of the blocked amine compound.

11. A coating composition according to claim 1, comprising from about 10% to about 60% by weight of the alkyd polymer, based on the combined weights of the alkyd polymer, the acetoacetate-functional material, and the blocked polyamine compound.

12. An automotive refinish intermix system, comprising
    a plurality of color components comprising at least one pigment and at least one alkyd resin,
    an unpigmented component comprising an acetoacetate-functional material having at least two acetoacetate groups, wherein said acetoacetate-functional material has a molecular weight of up to about 1000, and
    an unpigmented component comprising a blocked polyamine compound wherein the alkyd is not reactive toward the acetoacetate-functional material or the blocked polyamine compound.

13. An automotive refinish intermix system according to claim 12, further comprising an unpigmented component comprising a metal drier.

14. A method of refinishing at least a part of an exterior surface of an automotive vehicle having an original finish color, comprising steps of:
    providing an automotive refinish intermix system according to claim 12;
    combining the components to produce a refinish coating composition of the desired color; and
    applying the refinish coating composition to at least a part of the exterior surface.

15. A method according to claim 14, wherein the colored refinish coating composition comprises a sufficient amount of the acetoacetate resin and the blocked polyamine compound to be dry to handle within one hour after being applied.

16. A method according to claim 14, wherein the refinish coating composition is applied as a basecoat layer and a clearcoat composition is applied over the basecoat layer.

17. An automotive refinish intermix system, comprising a plurality of color components comprising at least one pigment, at least one alkyd resin, and one member selected from the group consisting of an acetoacetate-functional material having at least two acetoacetate groups, wherein said acetoacetate-functional material has a molecular weight of up to about 1000, and a blocked polyamine compound, and an unpigmented component comprising the other member of the group not in the color components, wherein the alkyd is not reactive toward the acetoacetate-functional material or the blocked polyamine compound.

18. An automotive refinish intermix system according to claim 17, wherein the color component include the acetoacetate-functional material and the unpigmented component includes the blocked polyamine compound.

19. An automotive refinish intermix system according to claim 17, wherein the color component include the blocked polyamine compound and the unpigmented component includes the acetoacetate-functional material.

20. An automotive refinish intermix system according to claim 17, further comprising an unpigmented component comprising a metal drier.

* * * * *